United States Patent Office 3,419,370
Patented Dec. 31, 1968

3,419,370
METHOD OF PRODUCING A PHOTOCHROMIC GLASS AND RESULTING ARTICLE
William H. Cramer, Corning, and Harmon M. Garfinkel, Horseheads, N.Y., assignors to Corning Glass Works, Corning, N.Y., a corporation of New York
No Drawing. Filed Nov. 22, 1965, Ser. No. 509,164
10 Claims. (Cl. 161—1)

This invention relates to glass articles having surface portions which exhibit photochromic behavior.

In United States Patent No. 2,911,749 there is disclosed the development of a useful two-dimensional photographic image in a glass by silver ion exchange, the glass being a silicate composition containing an alkali metal oxide. The procedure for producing such images involves two essential steps: (1) a chemically-fixed, photographic image composed of colloidal silver or a compound of silver is formed on the surface of this silicate glass by a conventional process and then (2) the glass together with the image is heated under oxidizing conditions at a temperature between about 125° C. below the strain point of the glass and just below its softening point for a time of sufficient length to oxidize and ionize the silver to effect migration of silver ions into the glass in exchange for alkali metal ions therein. This process produces a clearly-visible, permanent image in the glass which is usually yellow-to-brown in color, this color presumably being due to the reduction of silver ions to atomic silver.

In United States Patent No. 3,208,860 the fundamental concepts of a glass exhibiting photochromic behavior, or phototropic behavior as it is termed therein, are discussed. A photochromic glass displays varying optical transmissions depending upon the radiation to which it is subjected, the change in transmission obtaining only so long as the actinic radiation impinges upon the glass. That application discloses silicate glass compositions having radiation-sensitive crystals dispersed therein in such quantity that the glass will darken when exposed to radiations in the ultraviolet and lower visible portions of the spectrum and will return to its original transmission when these radiations are removed. The examples set out therein utilize essentially submicroscopic crystals of the three silver halides, silver chloride, silver bromide, and silver iodide, to yield the desired photochromic behavior. That patent, while dealing principally with the incorporation of the silver halides in the glass batch such that they are uniformly dispersed throughout the glass body, does broadly disclose the employment of silver ion exchange to produce a relatively thin surface layer in a glass body which will exhibit photochromic properties. The present invention is directed toward glass compositions which exhibit exceptionally desirable photochromic behavior when treated in accordance with the method hereinafter described.

The advantages in producing a photochromic glass by means of an ion exchange process rather than a batch technique are several: First, higher glass melting temperatures can be utilized since highly volatile silver salts are not present in the batch; second, the silver ion concentration can be maintained at a high value in a thin surface layer while the overall average concentration in a particular glass body can be much lower than that normally used in batch melting; third, the surface concentration of silver can be simply adjusted; and fourth, the intensity of color per unit volume of "active" sample obtained is greater since a higher halide concentration can be utilized in the glass with the glass remaining transparent. A fifth advantage which has frequently been observed is the increase in the fading rate of the glass. The explanation for this factor is not fully understood but is believed to be due to the "structure" of the photochromic glass article made through ion exchange. This faculty of very rapidly returning to the original transmittance of the glass is of extreme importance in certain applications such as sunglasses where substantially instantaneous reversal is desirable. The fact that the radiation-sensitive crystals are confined to a surface layer appears to result in these crystals returning to their original transmittance more rapidly. This feature of more rapid fading may be an offshoot of the fourth advantage, cited above, in that a fewer total number of radiation-sensitive crystals are required to provide the same darkening as a body-crystallized article. Hence, there are fewer crystals which must return to their undarkened state.

The principal object of this invention, therefore, is to provide a method for making glasses exhibiting photochromic behavior by silver ion exchange which exhibits both rapid darkening and rapid fading to its original optical transmittance.

Another object of this invention is to provide a method for making a glass exhibiting photochromic properties by silver ion exchange which is readily practical and economical in operation.

Fundamentally, this invention contemplates contacting glasses falling within a relatively narrow range of compositions with silver ions under rather exacting conditions of time and temperature. In order to obtain the advantageous properties desired in the glass articles of this invention, we have discovered that the base glass should be in the general system $R_2O$—$B_2O_3$—$Al_2O_3$—$SiO_2$ wherein $R_2O$ refers to the alkali metal oxides $Li_2O$, $Na_2O$, and $K_2O$. Since the halide ion cannot be ion exchanged, the necessary chloride, bromide, or iodide required to react with the silver ion during the exchange process must also be present in the base glass. Thus, we have learned that the principal object of our invention can be attained by utilizing glasses within the following composition ranges, expressed in weight percent on the oxide basis, of about 5–15% $R_2O$, the $R_2O$ consisting of 0–5% $Li_2O$, 0–5% $K_2O$, and 5–15% $Na_2O$, 15–22% $B_2O_3$, 7–14% $Al_2O_3$, 50–65% $SiO_2$, and at least one halide in the indicated proportion selected from the group consisting of 0.2–3% Cl, 0.1–3% Br, and 0.1–4% I, the total of said halides not exceeding about 5%, the sum of the $R_2O$, $B_2O_3$, $Al_2O_3$, $SiO_2$, and halide constituting at least 95% by weight of the glass.

Table I records glass compositions, expressed in weight percent as calculated from the batch on the oxide basis, which have exhibited the desired photochromic behavior after being subjected to the ion exchange procedure of this invention. The batch components may comprise any materials, either oxides or other compounds which, on being melted together, are converted to the desired oxide compositions in the proper proportions.

Flouring is well-known in the glassmaking art as a melting aid and is a batch ingredient here for that purpose as well as to inhibit devitrification as the melt is cooled. Although silver fluoride crystals have not been detected following the ion exchange treatment, the amount of fluorine is kept low to preclude the possible precipitation of other crystalline fluorides within the glass.

Copper oxide in amounts less than about 0.1% by weight, computed as CuO, appears to increase the sensitivity of the glass and improve the photochromic properties thereof. Likewise, the addition of low-temperature reducing agents such as tin oxide, computed as SnO, iron oxide, computed as FeO, arsenic oxide, computed as $As_2O_3$, and antimony oxide, computed as $Sb_2O_3$ in amounts totaling less than 1% by weight may enhance the photochromic behavior of the glass.

The addition of certain other oxides such as MgO, CaO, SrO, BaO, ZnO, ZrO, and PbO may be beneficial in improving the quality of the base glass or in providing a glass having certain desired physical properties over and above photochromic behavior.

Nevertheless, the total of all additions to the base glass, including those recited above, should be kept below about 5 weight percent to assure the most advantageous photochromic properties in the final product.

Articles of predetermined configurations were formed from the glass compositions recorded in Table I by comlisted oxide compositions, ball milling these ingredients to aid in obtaining a homogeneous melt, and then melting the batch in covered crucibles for six hours at about 1450° C. The loss by volatilization of the halide is approximately 40% by weight. Therefore, the examples set forth in Table I reflect the necessary allowance made for this volatilization. The melts were then poured and rolled into plates, the plates being cooled to room temperature following a conventional annealing schedule. This cooling to room temperature permits visual inspection of the quality of the glass. In each instance, the rapidity of the cooling of the glass as it was rolled into plates was such that devitrification did not occur. The plates were then subjected to the ion exchange procedure of this invention. Since it is not known with which cation the halides are combined in the glass, they are recorded in Table I as individual components in accordance with conventional analytical practice.

TABLE I
[In percent]

| | 1 | 2 | 3 | 4 | 5 |
|---|---|---|---|---|---|
| $SiO_2$ | 57.96 | 58.88 | 58.97 | 58.82 | 58.47 |
| $B_2O_3$ | 20.46 | 19.94 | 19.96 | 19.94 | 18.55 |
| $Al_2O_3$ | 9.03 | 9.16 | 9.17 | 9.48 | 9.12 |
| $Na_2O$ | 10.92 | 10.08 | 10.08 | 10.56 | 11.76 |
| F | 1.24 | 1.24 | 1.24 | 0.78 | 1.46 |
| CuO | 0.016 | 0.016 | 0.016 | 0.016 | 0.015 |
| Cl | 0.40 | | 0.21 | 0.37 | 0.61 |
| Br | | 0.68 | 0.35 | | |
| $K_2O$ | 0.04 | | | 0.03 | |

| | 6 | 7 | 8 | 9 | 10 |
|---|---|---|---|---|---|
| $SiO_2$ | 57.01 | 56.49 | 58.46 | 57.88 | 57.67 |
| $B_2O_3$ | 18.37 | 18.22 | 18.85 | 18.67 | 19.06 |
| $Al_2O_3$ | 9.04 | 8.96 | 9.27 | 9.18 | 8.83 |
| $Na_2O$ | 10.51 | 10.42 | 10.79 | 10.68 | 10.73 |
| F | 1.43 | 1.41 | 1.46 | 1.44 | 2.76 |
| CuO | 0.016 | 0.016 | 0.016 | 0.016 | 0.014 |
| Cl | 1.57 | 1.56 | | | 0.91 |
| Br | 1.97 | 0.97 | 1.01 | 1.99 | |
| PbO | 0.1 | 1.95 | 0.1 | 0.1 | |

| | 11 | 12 | 13 | 14 | 15 |
|---|---|---|---|---|---|
| $SiO_2$ | 57.25 | 56.66 | 56.22 | 58.14 | 57.05 |
| $B_2O_3$ | 18.44 | 18.27 | 18.13 | 18.75 | 18.40 |
| $Al_2O_3$ | 9.08 | 8.99 | 8.91 | 9.22 | 9.04 |
| $Na_2O$ | 10.54 | 10.45 | 10.37 | 10.73 | 10.53 |
| F | 1.43 | 1.42 | 1.41 | 1.45 | 1.43 |
| CuO | 0.016 | 0.016 | 0.016 | 0.016 | 0.016 |
| Cl | 1.18 | 1.17 | 1.94 | 1.6 | 1.57 |
| Br | 1.97 | 2.93 | 2.91 | | 0.98 |
| PbO | 0.1 | 0.1 | 0.1 | 0.1 | 0.98 |

| | 16 | 17 | 18 | 19 | 20 | 21 |
|---|---|---|---|---|---|---|
| $SiO_2$ | 50.18 | 57.52 | 55.94 | 55.62 | 58.64 | 60.00 |
| $B_2O_3$ | 17.79 | 18.64 | 18.05 | 17.93 | 20.00 | 20.00 |
| $Al_2O_3$ | 8.75 | 9.13 | 8.87 | 8.82 | 9.00 | 9.00 |
| $Na_2O$ | 10.18 | 10.60 | 10.32 | 10.26 | 10.00 | 10.00 |
| F | 1.38 | 1.44 | 1.40 | 1.39 | 1.35 | 1.35 |
| CuO | 0.015 | 0.016 | 0.015 | 0.015 | 0.032 | 0.016 |
| Cl | 3.8 | 1.59 | 1.54 | 1.53 | 0.6 | 0.60 |
| Br | 2.8 | 1.0 | 0.96 | | | |
| PbO | 0.09 | 0.1 | 2.89 | 0.09 | | |
| I | | | | 4.36 | 0.18 | |
| CdO | | | | | 0.20 | 0.05 |

To illustrate the extent of the halide volatilization, a chemical analysis of the glass resulting from melting the batch set out in Example I is recorded below:

Percent
$SiO_2$ ------------------------------------- 58.40
$B_2O_3$ ------------------------------------ 20.40
$Al_2O_3$ ----------------------------------- 9.23
$Na_2O$ ------------------------------------ 10.80
F ------------------------------------------ 0.70
CuO ---------------------------------------- 0.013
Cl ----------------------------------------- 0.25
$K_2O$ ------------------------------------- 0.04

These glasses exhibited no photochromic behavior as formed nor after being subjected to a heat treatment such as it described in the above-mentioned Patent No. 3,208,860. We have discovered, however, that these glasses can be made to exhibit excellent photochromic properties, i.e., they will darken rapidly to a low optical transmittance when subjected to radiations within the wave lengths of about 3000–5500 A. (0.3–0.55 micron) and will rapidly regain their original optical transmittance when the impinging actinic radiation is removed, by following the process steps set out hereinafter for thermochemically exchanging ions in the surface of the glass.

In general, the ion exchange method of this invention for producing a surface layer on a glass article which will display photochromic properties contemplates exposing the glass surface to a source of silver ions which, at an elevated temperature, will exchange with an ion present in the glass, this ion being one of the alkali metals lithium, sodium, or potassium. The substituting silver ions react with the chloride, bromide, or iodide ions present in the glass to form crystals of silver chloride, silver bromide, or silver iodide of such size and in such quantity to cause this developed surface layer to exhibit photochromic behavior. Therefore, the basis for this invention resides in forming an article of glass having the composition specified and thereafter thermochemically exchanging silver ions from an external source in contact with the glass with alkali metal ions from a surface of the glass for a sufficient length of time to precipitate silver halide crystals in situ in the surface that impart photochromic properties.

Examinations of these surface layers of ion-exchanged glasses utilizing electron microscopy have demonstrated the presence of silver halide crystals, normally all being smaller than about 0.1 micron and many smaller than 0.01 micron, and comprising at least 0.005% by volume of the surface layer. Such examinations, coupled with chemical analyses of these surface layers, have indicated that ion exchange in accordance with the instant invention may be effected to a depth of a hundred microns or more within a reasonably short period of time. As would be expected, the extent of exchange decreases in a gradient perpendicular to the surface. Hence, the depth of the ion-exchanged layer and the concentration of crystals therein are a function of the time the exchange treatment is continued.

During the thermally-induced ion exchange, alkali metal ions from the glass are replaced by a corresponding number of silver ions from the contacting material to maintain a balance of electrical charges in the glass. Since the ion exchange process is thermally induced, the depth of the exchange is a function of the temperature employed as well as the time of treatment. The final product of the invention, then, consists of a glass body having a central parent portion of the above-recited composition with at least one surface layer containing silver halide crystals, this surface layer exhibiting a decrease in alkali metal ion content as compared with the parent glass but having an equivalent amount of silver ion content replacing the lost alkali metal ion content.

The ion exchange process of this invention is basically a diffusion-type process wherein the amount of ion exchange per unit surface area exposed increases in proportion to the square root of the treating time at constant temperature. Hence, it is generally axiomatic that the activating temperature should be as high as is practically feasible, with due regard for thermal deformation of the glass article, thermal decomposition of the silver-containing contact material, and other thermally-produced adverse effects. In the majority of applications, the ion exchange is preferably carried out at temperatures below the strain point of the glass so that thermal deformation of the glass article is precluded. Nevertheless, in those applications such as automobile windshields where the final shape of the article is produced through sagging into a mold or onto a pattern, the ion exchange can be carried at temperatures above the softening point of the glass. In general, at temperatures above the softening point of the glass, as little time as 10 minutes may be effective whereas at the lower end of the temperature scale as much as 6 hours may be required for satisfactory exchange. This, of course, is a direct result of the more rapid rate of diffusion at higher temperatures.

The advantageous photochromic properties are produced in the above-recited glass compositions through the ion exchange treatment thereof at temperatures ranging from about 100° C. below their strain points (350–475° C.) to as high as about 100° C. above their softening points (700–825° C.). As has been explained above, the depth of ion exchange is dependent upon the temperature utilized and the time of treatment. Therefore, it is apparent that the treating schedule followed is governed by the depth of ion exchange layer required to produce the desired photochromic properties in the glass.

We have discovered that the depth of the ion exchange layer is significant in two principal aspects: (1) the minimum optical transmittance the glass will exhibit when subjected to actinic radiation; and (2) the rate at which the glass will fade to its original transmittance when the actinic radiation is removed. The first factor varies directly with the depth of the exchange layer while the second appears to vary inversely. This phenomenon appears to exhibit the optimum compromise of these two factors when the ion exchange layer, either a single plane or a combination of planes, ranges from about 0.1–1 mm. in thickness.

In carrying out the process of this invention, the material brought into contact with the glass surface to effect ion exchange may be any stable ionized or ionizable composition containing silver ions, including metallic silver, and may be in gaseous, liquid, or solid form. The only requirement appears to be that there be intimate contact of the exchangeable ions with a glass surface containing one of the three above-recited alkali metal ions.

One convenient means of performing the invention utilizes the immersion of the preformed glass body into a molten salt bath, the most useful being a silver nitrate bath. As can be appreciated, the silver salt must be stable at the temperature at which it is desired to carry out the ion exchange. Silver nitrate has a melting point of 212° C. and begins to decompose appreciably at temperatures approaching 444° C. and, therefore, can be utilized where exchange below the strain point of the glass is desired, and, preferably, is used at temperatures below 400° C. Mixed salts may also be employed although where any combination of a silver salt and an alkali metal salt is used, the alkali metal salt should preferably be of the same cation as that in the glass. Hence, in $Na_2O$-containing glasses, a mixture of 10% $AgNO_3$–90% $NaNO_3$ has been used. Such a mixture reduces the cost and, since the exchange takes place more slowly than where a pure silver salt is employed, a more careful control of the depth of the ion exchanged layer is possible. The use of a diluent salt containing an alkali metal cation other than the one present in the glass hazards the exchange of these cations rather than with the desired silver. Other salt baths which, being thermally stable within the necessary temperature range, have been utilized successfully include AgCl, AgBr, $Ag_2S$, and $Ag_2SO_4$. These can be employed as the pure salts or in combination with various diluents. A particularly useful bath was composed of 50% AgCl–50% $PbCl_2$. Here a glass sheet could be drawn and floated over this bath thereby giving a smooth surface as well as providing an efficient means for obtaining the desired ion exchange. The $AgNO_3$ bath has been preferred since etching and/or staining problems with the glass have been substantially absent.

The ion exchange process may also be effected by applying a paste material over the glass surface and then heating the coated glass at the predetermined temperature for the proper time. This paste is generally a mixture of the proper time. This paste is generally a mixture of a silver-containing material, a small amount of inert binder and/or filler material such as ochre, and an organic vehicle although, in some instances, water has been employed as the vehicle.

Laboratory work has demonstrated that the clarity of the final product and the photochramic properties thereof can be improved by subjecting the ion exchanged glass article to various heat treatment. In one embodiment, the glass article, after being removed from contact with the silver-containing salt and any salt clinging thereto removed by brushing or washing, is subjected to heat treatment in an inert atmosphere, i.e., an atmosphere such as air which does not chemically affect the glass, at a temperature above the strain point of the glass but sufficiently below its softening point such that deformation of the glass does not occur. In those unusual instances where sagging of the glass is part of the forming process, e.g., curved automobile windshields, a heat treatment at the softening point of the glass is possible. However, the most favorable combination of photochromic properties is generally attained where the heat treatment is carried out below the softening point of the glass. This heat treatment is believed to enhance the migration of the silver ions to combine with the residual halide ions. The time utilized for this heat treatment is that which is sufficient to accomplish this precipitation step, generally about ½–12 hours. Longer times may be employed without harm to the final product but such are usually unnecessary and uneconomical. In some instances, better photochromic properties are developed where two or more successive short time heat treatments are utilized rather than one long one, e.g., heating the article to 600° C., maintaining thereat for four hours, cooling to room temperature, reheating to 600° C., and maintaining thereat for another four hours.

A still further modification in the practice of this invention and which constitutes the preferred embodiment thereof contemplates a two-step heat treating procedure after the glass article has been ion exchanged. In this procedure, the glass article is formed in any conventional manner and then contacted with a silver-containing salt as described above. After the glass article has been removed from the ion exchange medium and any adhering salt has been eliminated, the article is first exposed in an inert atmosphere such as air to a temperature ranging from just below the strain point to as much as 150° C. below the strain point of the glass for a relatively long period of time, usually from about 4–64 hours. Following this, the article is subjected to the type of heat treatment described in detail in the previous paragraph, i.e., at temperatures above thes train point of the glass but usually below the softening point thereof. The exact function of this long tim, low temperature heat treatment is not fully understood but is believed to permit the silver ions to diffuse more uniformly in the glass so as to provide a more homogeneous layer of photochromic glass during the subsequent higher temperature precipitation step. These procedural steps yield a glass body of the highest clarity, i.e., having the greatest initial optical transmittance, and exhibiting the most advantageous photochromic properties with respect to the rates of darkening and fading and the maximum optical density upon exposure to actinic radiation.

It can be appreciated that a gradient in photochromic behavior across a glass body is readily attainable by varying the time and/or temperature at which different portions of the glass body are exposed to the ion exchange medium. An important example of the use of such a gradient is in the windshield for an automobile where very low optical transmission is desirable in that portion above eye level but less darkening desirable at and below eye level. Such a gradient can easily be attained by immersing the different areas of the windshield for different lengths of time in the ion exchange bath.

Table II records the various ion exchange treatments and subsequent heat treatments, where utilized, and the resultant photochromic behavior attained thereby. In each of the following exchanges, the ion exchanging medium consisted of a molten bath of the recited salt or combination of salts. The rate of heating employed in bringing the glass plate from room temperature to the temperature of the salt bath appears to have no substantial effect on the final results. The plates may be plunged directly into the bath operating at the desired temperature, where the size and shape of the plate is not such that breakage due to thermal shock will occur, or they may be heated at essentially any rate. Likewise, the ion exchanged articles may be cooled at substantially any rate so long as they are not damaged through thermal shock or become subject to undesirable residual stresses. In each of the following examples where a salt bath temperature of 500° C. or below was utilized, the glass plates were plunged directly into the salt bath areas whereas those plates exposed to higher temperature baths were first heated in air to about 500° C. and then immersed into the bath.

In like manner, where a heat treatment is applied subsequent to the ion exchange, the glass plates may be heated at substantially any rate to the desired temperature so long as thermal breakage is avoided. Since the thermal shock is less than when the glass body is immersed in the salt bath, in each instance cited the glass plate was plunged directly into a furnace operating at the desired temperature. The plates were merely taken out of the furnace and allowed to cool to room temperature at the completion of each run.

The measure of the photochromic behavior of the glasses may be demonstrated by determining the optical transmittance of the glass plate before and after exposure for a specified period of time to actinic radiation and again after a time interval following the termination of such exposure. In Table II, $T_0$ represents the initial visible transmission, expressed in percent, of the glass after ion exchange and any subsequent heat treatment thereof, i.e., the transmission to visible light of the article after subjection to the practice of this invention but before exposure to actinic radiation. $T_{00}$ represents the equilibrium transmission of the glass. Equilibrium transmission is defined herein as the transmission of visible radiation of the glass after it has been exposed to actinic radiation of substantially constant intensity for a sufficient length of time to permit its percent transmission to assume a constant value. In the present examples, a ten-minute exposure to ultraviolet radiation (3650 A.) produced by a commercial "Mineralite" long-wave ultraviolet lamp having a 9-watt input, the output being filtered to remove the major proportion of the visible energy, was arbitrarily deemed to place the sample at equilibrium. $H_{ft}$ signifies the half-fading time or the time in seconds at which the concentration of color centers after exposure to and removal from the actinic radiation is one-half that at equilibrium. Since the rate of fading appears to be a logarithmic function, this expression provides a useful measure of the rate of fading of the darkened glass or its ability to regain its original transmission. Each of these tests was conducted at room temperature on polished samples about 1¼" x 1¼" x 2 mm. in thickness.

TABLE II

| Example No. | Salt Bath Composition | Exchange Treatment | Heat Treatment | $T_0$, percent | $T_{00}$, percent | $H_{ft}$, seconds |
| --- | --- | --- | --- | --- | --- | --- |
| 1 | 20% $AgNO_3$, 80% $NaNO_3$ | 400° C., 2 hrs | | 80 | 40 | 40 |
| 1 | 20% $AgNO_3$, 80% $NaNO_3$ | 400° C., 4 hrs | | 75 | 35 | 45 |
| 1 | 10% $AgNO_3$, 90% $NaNO_3$ | 400 °C., 4 hrs | 300° C., 8 hrs.; 650° C., 4 hrs. | 88 | 25 | 20 |
| 2 | 10% $AgNO_3$, 90% $NaNO_3$ | 300° C., 4 hrs | | 89 | 50 | 40 |
| 2 | 20% $AgNO_3$, 80% $NaNO_3$ | 400° C., 2 hrs | 600° C., 4 hrs | 88 | 30 | 30 |
| 3 | 10% AgCl, 90% NaCl | 550° C., 1 hr | | 90 | 45 | 60 |
| 3 | 20% $Ag_2SO_4$, 80% $Na_2SO_4$ | 800° C., 15 min | | 90 | 60 | 75 |
| 3 | 50% AgCl, 50% $PbCl_2$ | 800° C., 15 min | 400° C., 6 hrs.; 600° C., 4 hrs. | 90 | 25 | 20 |
| 4 | 10% $AgNO_3$, 90% $NaNO_3$ | 400° C., 3 hrs | | 89 | 30 | 40 |
| 4 | 20% $AgNO_3$, 80% $NaNO_3$ | 350° C., 4 hrs | 300° C., 8 hrs.; 600° C., 6 hrs. | 91 | 22 | 20 |
| 5 | 10% $Ag_2SO_4$, 90% $Na_2SO_4$ | 750° C., 30 min | 700° C., 4 hrs | 89 | 31 | 25 |
| 5 | 10% AgBr, 90% NaCl | 550° C., 3 hrs | 350° C., 24 hrs.; 600° C., 4 hrs. | 87 | 25 | 20 |
| 6 | 10% AgCl, 90% NaCl | 650° C., 2 hrs | 600° C., 6 hrs | 89 | 22 | 80 |
| 6 | 100% $AgNO_3$ | 250° C., 6 hrs | | 91 | 25 | 60 |
| 7 | 20% $AgNO_3$, 80% $NaNO_3$ | 300° C., 6 hrs | | 89 | 45 | 40 |
| 7 | 10% $AgNO_3$, 90% $NaNO_3$ | 400° C., 6 hrs | 300° C., 8 hrs.; 600° C., 2 hrs. | 90 | 30 | 30 |
| 8 | 20% $Ag_2SO_4$, 80% $Na_2SO_4$ | 550° C., 1 hr | 600° C., 2 hrs | 88 | 40 | 50 |
| 8 | 10% AgCl, 90% NaCl | 600° C., 2 hrs | 400° C., 12 hrs.; 600° C., 2 hrs. | 90 | 30 | 30 |
| 8 | 100% $AgNO_3$ | 250° C., 6 hrs | | 90 | 40 | 60 |
| 8 | 10% AgCl, 90% NaCl | 550° C., 2 hrs | 600° C., 6 hrs | 88 | 35 | 50 |
| 9 | 100% $AgNO_3$ | 300° C., 3 hrs | 400° C., 16 hrs.; 600° C., 2 hrs. | 90 | 30 | 35 |
| 9 | 100% $AgNO_3$ | 300° C., 4 hrs | 400° C., 24 hrs.; 600° C., 4 hrs. | 89 | 25 | 20 |
| 10 | 10% $Ag_2SO_4$, 90% $Na_2SO_4$ | 600° C., 30 min | 600° C., 2 hrs | 90 | 29 | 32 |
| 10 | 20% $Ag_2SO_4$, 80% $Na_2SO_4$ | 600° C., 30 min | 600° C., 6 hrs | 90 | 25 | 28 |
| 11 | 50% AgCl, 50% $PbCl_2$ | 700° C., 30 min | 400° C., 12 hrs.; 600° C., 4 hrs. | 87 | 30 | 25 |
| 11 | 50% AgCl, 50% $PbCl_2$ | 800° C., 15 min | 400° C., 8 hrs.; 600° C., 4 hrs. | 85 | 30 | 30 |
| 12 | 100% $AgNO_3$ | 300° C., 4 hrs | 600° C., 8 hrs | 89 | 28 | 33 |
| 12 | 100% $AgNO_3$ | 300° C., 4 hrs | 400° C., 8 hrs.; 600° C., 6 hrs. | 90 | 25 | 20 |
| 13 | 10% $AgNO_3$, 90% $NaNO_3$ | 300° C., 4 hrs | 650° C., 4 hrs | 90 | 35 | 35 |
| 13 | 20% $AgNO_3$, 80% $NaNO_3$ | 300° C., 4 hrs | 300° C., 24 hrs.; 600° C., 2 hrs. | 92 | 15 | 25 |
| 14 | 10% AgBr, 90% NaCl | 600° C., 1 hr | | 88 | 40 | 50 |
| 14 | 10% AgBr, 90% NaCl | 600° C., 1 hr | 700° C., 4 hrs | 88 | 30 | 35 |
| 15 | 10% $AgNO_3$, 90% $NaNO_3$ | 350° C., 4 hrs | 600° C., 3 hrs | 90 | 40 | 30 |
| 15 | 20% $AgNO_3$, 80% $NaNO_3$ | 400° C., 2 hrs | 300° C., 12 hrs.; 650° C., 2 hrs. | 91 | 16 | 11 |
| 16 | 100% $AgNO_3$ | 300° C., 4 hrs | 400° C., 16 hrs.; 600° C., 6 hrs. | 90 | 20 | 20 |
| 16 | 10% $AgNO_3$, 90% $NaNO_3$ | 400° C., 4 hrs | 660° C., 8 hrs | 89 | 25 | 25 |
| 17 | 10% $AgNO_3$, 90% $NaNO_3$ | 400° C., 4 hrs | 400° C., 24 hrs.; 600° C., 2 hrs. | 90 | 22 | 25 |
| 17 | 100% $AgNO_3$ | 300° C., 4 hrs | 600° C., 8 hrs | 91 | 25 | 35 |
| 18 | 10% $Ag_2SO_4$, 90% $Na_2SO_4$ | 600° C., 30 min | | 89 | 40 | 70 |
| 18 | 10% $Ag_2SO_4$, 90% $Na_2SO_4$ | 600° C., 30 min | 400° C., 16 hrs.; 600° C., 4 hrs. | 89 | 25 | 30 |
| 19 | 10% $AgNO_3$, 90% $NaNO_3$ | 350° C., 4 hrs | | 90 | 45 | 60 |
| 19 | 10% $AgNO_3$, 90% $NaNO_3$ | 350° C., 4 hrs | 600° C., 12 hrs | 89 | 30 | 35 |
| 20 | 10% $Ag_2SO_4$, 90% $Na_2SO_4$ | 750° C., 30 min | 700 °C., 4 hrs | 89 | 31 | 25 |
| 20 | 10% AgCl, 90% NaCl | 650° C., 2 hrs | 600° C., 6 hrs | 89 | 22 | 80 |
| 21 | 20% $AgNO_3$, 80% $NaNO_3$ | 300° C., 4 hrs | 300° C., 24 hrs.; 600° C., 2 hrs. | 92 | 13 | 25 |

Table II clearly illustrates the advantageous photochromic properties which can be attained in glasses having the specified compositions by utilizing the time-temperature schedule found particularly appropriate for the ion exchange process. Hence, where the temperature for ion exchange is more than about 100° C. below the strain point of the glass, the diffusion of the silver ions into the surface of the glass is so slow as to be commercially unsuitable. Further, as has been discussed above, etching and staining of the glass surface by the silver-containing and/or the diluent salts can be a problem. Therefore, contact of the glass with these salts for a very long length of time is to be avoided. At temperatures much in excess of 100° C. above the softening point of the glass, extreme deformation and even flow of the glass is hazarded. Also, volatilization of the salt baths employed can be a safety hazard to the operating personnel. Finally, the exchange occurs so rapidly that careful control to obtain a homogeneous layer of photochromic glass is very difficult.

Table II illustrates that the glasses of this invention can be made through the ion exchange process alone which will darken when exposed to actinic radiation to as low as a transmission of about 30% with a half fading time of less than one minute. Where subsequent heat treatments are applied to the ion-exchanged glasses, the minimum transmission can be reduced to about 10% with a half fading time of about 10 seconds.

We claim:

1. A glass body having a surface layer exhibiting excellent photochromic properties comprising a central parent portion consisting essentially, as analyzed in weight percent on the oxide basis, of about 50–65% $SiO_2$, 7–14% $Al_2O_3$, 15–22% $B_2O_3$, 5–15% $R_2O$, where $R_2O$ consists of at least one alkali metal oxide in the indicated proportion selected from the group consisting of 0–5% $Li_2O$, 0–5% $K_2O$, and 5–15% $Na_2O$, and at least one halide in the indicated proportion selected from the group consisting of 0.2–3% Cl, 0.1–3% Br, and 0.1–4% I, the total amount of said halides not exceeding about 5%, the sum of the $SiO_2$, $Al_2O_3$, $B_2O_3$, $R_2O$, and halide components constituting at least about 95% by weight of the glass, and a surface layer consisting of silver halide crystals dispersed in a glassy matrix, said surface layer having a lesser alkali metal ion content than the central parent portion with a silver ion content equivalent to this decrease in alkali metal ion content.

2. The method of forming a surface layer exhibiting excellent photochromic properties on a glass body which comprises:
   (a) providing a glass body consisting essentially, as analyzed in weight percent on the oxide basis, of about 50–65% $SiO_2$, 7–14% $Al_2O_3$, 15–22% $B_2O_3$, 5–15% $R_2O$, where $R_2O$ consists of the alkali metal oxides 0–5% $Li_2O$, 0–5% $K_2O$, and 5–15% $Na_2O$, and at least one halide in the indicated proportion selected from the group consisting of 0.2–3% Cl, 0.1–3% Br, and 0.1–4% I, the total amount of said halides not exceeding about 5%, the sum of the $SiO_2$, $Al_2O_3$, $B_2O_3$, $R_2O$, and halide components constituting at least 95% by weight of the glass;
   (b) contacting a surface of said glass body with at least one silver-containing material selected from the group consisting of silver and stable silver compounds at a temperature ranging from about 100° C. below the strain point of the glass to about 100° C. above the softening point of the glass; and
   (c) maintaining this temperature for a sufficient length of time to effect an exchange of silver ions for alkali metal ions in at least the surface of the glass and to cause a reaction of the silver ions with the halide ions present in the glass to precipitate silver halide crystals.

3. The method in accordance with claim 2 wherein the stable silver-containing material consists of at least one silver compound selected from the group consisting of $AgNO_3$, AgCl, AgBr, $Ag_2S$, and $Ag_2SO_4$.

4. The method in accordance with claim 2 wherein the time required to effect the exchange of silver ions for alkali metal ions and to precipitate silver halide crystals ranges from about 10 minutes to 6 hours.

5. The method in accordance with claim 2 wherein the silver halide crystals formed are essentially all smaller than about .1 micron in diameter.

6. The method in accordance with claim 2 wherein the glass body having a surface layer of silver halide crystals is exposed in an inert atmosphere to a temperature ranging between the strain point and the softening point of the glass for a time sufficient to enhance the migration of the silver ions in the surface of the glass to react with the halide ions present in the glass.

7. The method in accordance with claim 5 wherein the time sufficient to enhance the migration of the silver ions ranges from about ½–12 hours.

8. The method in accordance with claim 2 wherein the glass body having a surface layer of silver halide crystals is first exposed in an inert atmosphere to a temperature ranging from just below the strain point of the glass to about 150° C. below said strain point for a time sufficient to permit the silver ions to diffuse uniformly in the glass surface and thereafter said glass body is heated in an inert atmosphere to a temperature ranging between the strain point and the softening point of the glass for a time sufficient to enhance the migration of the silver ions in the surface of the glass to react with the halide ions present in the glass.

9. The method in accordance with claim 8 wherein the time sufficient to permit the silver ions to diffuse uniformly in the glass surface ranges from about 4–64 hours.

10. The method in accordance with claim 8 wherein the time sufficient to enhance the migration of the silver ions ranges from about ½–12 hours.

References Cited

UNITED STATES PATENTS

| | | | |
|---|---|---|---|
| 2,344,250 | 4/1944 | Jones | 65—30 XR |
| 2,647,068 | 7/1953 | Patai | 65—30 XR |
| 3,323,926 | 6/1967 | O'Leary | 65—33 XR |
| 3,325,299 | 6/1967 | Araujo | 65—33 XR |

DONNALL H. SYLVESTER, *Primary Examiner.*

J. H. HARMAN, *Assistant Examiner.*

U.S. Cl. X.R.

65—30, 31, 33; 117—118, 124; 106—39, 52, 54